United States Patent [19]
Schaepman

[11] 3,746,925
[45] July 17, 1973

[54] METHOD AND APPARATUS FOR DETERMINING CERTAIN ACCELERATIONS IN AN ANTISKID SYSTEM

[75] Inventor: Ellert Schaepman, Zurich, Switzerland

[73] Assignee: ITT Industries, Inc., New York, N.Y.

[22] Filed: May 31, 1972

[21] Appl. No.: 258,170

[52] U.S. Cl.................. 317/5, 303/21 CG, 307/232
[51] Int. Cl. ............................................... G01p 3/42
[58] Field of Search ................ 317/5; 307/232, 233; 303/21 CG

[56] References Cited
UNITED STATES PATENTS
3,649,871  3/1972  Klein et al. ............................. 317/5

Primary Examiner—J. D. Miller
Assistant Examiner—Harry E. Moose, Jr.
Attorney—C. Cornell Remsen, Jr., Menotti J. Lombardi et al.

[57] ABSTRACT

This relates to a digital acceleration sensor for use in an antiskid system. The sensor includes a first source of reference signals, a second source of wheel speed impulses, a first up-counter connected to the first source, a second down-counter coupled to the first source and the first counter, a third up-counter connected to the second source, a fourth downcounter coupled to the second source and the third counter, and logic circuitry coupled to the first source, the first counter, the second counter and the fourth counter. The counting value transferred to the second counter is counted down for a period determined by the fourth counter. The critical deceleration value to cause operation of the antiskid system is determined if the second counter changes its sign before the fourth counter has changed its sign.

18 Claims, 11 Drawing Figures

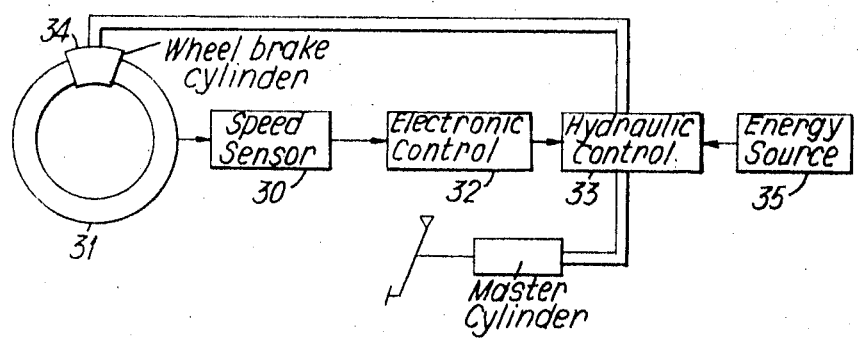
Fig. 1.
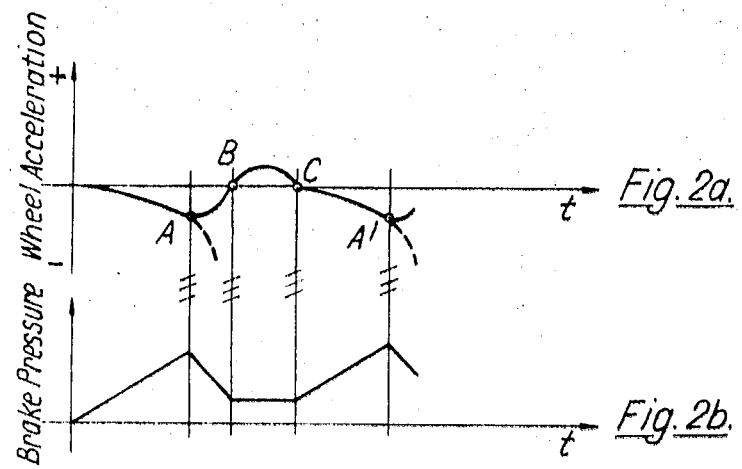
Fig. 2a.
Fig. 2b.
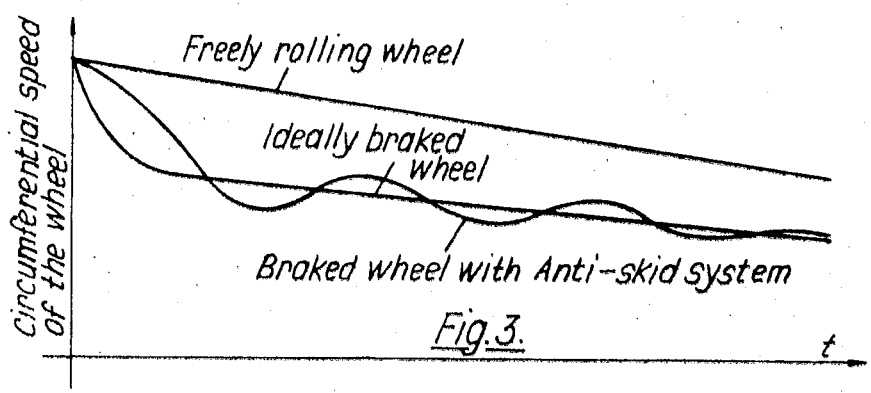
Fig. 3.

3,746,925

METHOD AND APPARATUS FOR DETERMINING CERTAIN ACCELERATIONS IN AN ANTISKID SYSTEM

BACKGROUND OF THE INVENTION

The present invention relates to method and apparatus for the determination of certain accelerations or decelerations (negative acceleration) of vehicular wheels controlled by an antiskid system.

The present invention particularly relates to method and apparatus for the determination of the critical deceleration for antiskid systems where the detection of the wheel speed and its temporal changes is effected by counting wheel impulses of a speed-dependent frequency during a certain period.

Antiskid systems are to prevent the locking of the wheels of a braked vehicle, since locked wheels cannot safeguard a lateral control and will cause the vehicle to veer off the course. Several antiskid systems are already known where the determination of the critical deceleration is effected by an analog method. It has, however, been proven that the analog determination of the critical deceleration in critical cases of adhesion or in the event of low speeds leads either to excessively long braking distances or to locking of the wheels, both effects not being permissible in an antiskid system.

SUMMARY OF THE INVENTION

Therefore, it is the object of the present invention to provide a method and apparatus for antiskid systems for the determination of the critical deceleration by a digital method and apparatus in order to avoid the disadvantages referred to above.

A feature of the present invention is the provision of a method for the determination of certain accelerations of at least one wheel of vehicular wheels controlled by an antiskid system comprising, during each measuring cycle, the steps of: generating first impulses proportional to the speed of the one wheel of the vehicular wheels; generating second impulses proportional to a predetermined constant frequency; counting the first impulses in an upward direction until a first given counting value is reached; counting the second impulses in an upward direction until the first given counting value is reached; counting the first impulses in a downward direction upon occurrence of a first of the first impulses after the first given counting value has been reached; counting the second impulses in a downward direction, under the influence of the counting the first impulses in a downward direction, upon occurrence of the first of the first impulses after the first given counting value has been reached; and determining from the counting value achieved in the last two steps of counting with respect to a second given counting value different than the first given counting value the certain accelerations.

Another feature of the present invention is the provision of an arrangement for the determination of certain accelerations of at least one wheel of vehicular wheels controlled by an antiskid system comprising: a first source of first impulses proportional to the speed of the one wheel of the vehicular wheels; a second source of second impulses proportional to a predetermined constant frequency; first means coupled to the first source to count the first impulses in an upward direction until a first given counting value is reached and to count the first impulse in a downward direction upon occurrence of a first of the first impulses after the first given counting value has been reached; second means coupled to the second source and the first means to count the second impulses in an upward direction until the first given counting value is reached and to count the second impulses in a downward direction, under the influence of the first means counting in a downward direction, upon occurrence of the first of the first impulses after the first given counting value has been reached; and third means coupled to the first and second means to determine from the relative counting values of the first and second means during counting in the downward direction with respect to a second given counting value different than the first given counting value the certain accelerations.

BRIEF DESCRIPTION OF THE DRAWING

Above-mentioned and other features and objects of this invention will become more apparent by reference to the following description taken in conjunction with the accompanying drawing in which:

FIG. 1 is a block diagram of the structure of an antiskid system for one wheel;

FIG. 2 illustrates curves of the ensuing wheel decelerations and accelerations and the associated pressure of a hydraulic brake;

FIG. 3 illustrates a diagram of a braking operation;

DESCRIPTION OF THE PREFERRED EMBODIMENT

Figure 4:
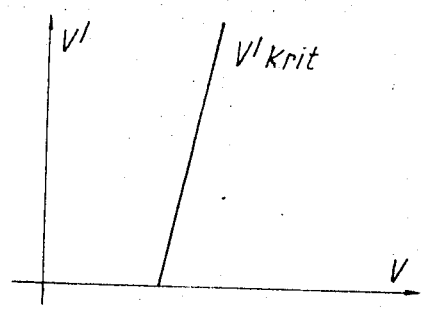
FIG. 4 illustrates the curve of the critical deceleration dependent upon the vehicular speed.

Usually an antiskid system consists of the components shown in FIG. 1, i.e., of a speed sensor 30 measuring the motion of the wheel 31 and emitting wheel speed impulses, of an electronic control 32 which in the event of locking danger causes a hydraulic control 33 to effect an expedient change in the brake pressure applied to wheel brake cylinder 34, and of an energy source 35 supplying the energy required to this end. Some of these components are separately provided for each wheel while others are provided in common to all wheels of a vehicle.

The working of such an antiskid system may be explained according to FIGS. 2 and 3. FIG. 2a shows the deceleration and acceleration of a wheel during a braking operation while FIG. 2b shows the associated brake pressure prevailing in the brake system pertaining to this wheel. FIG. 3 shows the speed at the wheel circumference during a braking operation.

At the onset of a braking operation the wheel is subject to an increasing deceleration (negative acceleration) as can be seen from FIG. 2a. At the same time the brake pressure prevailing in the hydraulic system of the wheel will increase. At point A in FIG. 2a the critical deceleration will be reached, the dotted line indicating the further course of the wheel deceleration if no intervention in the hydraulic control takes place. The term "critical deceleration" refers to that deceleration of the wheel where the slip between the wheel and the road surface reaches a value above which the static friction passes over into the undesired sliding friction, the wheel thus locking and virtually losing all lateral control. From driving tests it is known that with a slip of 15–20 percent the mathematical product of brake force coefficient and lateral control coefficient will be a maximum.

At point A electronic control 32 emits an order to hydraulic control 33 for reducing the brake pressure, the brake pressure thereupon decreasing as illustrated in FIG. 2b and the wheel reaccelerating up to the zero passage at point B. At point B hydraulic control 33 will receive an order to keep the brake pressure on a constant level until point C is reached. From point C the brake pressure will reincrease until point A is reached again, this point being identified as A' in FIG. 2a.

FIG. 3 illustrates that the speed at the wheel circumference oscillates round a straight line due to the described manipulation of the brakepressure, said straight line representing an ideally braked wheel, i.e., a wheel which throughout the braking operation is retarded exactly in accordance with the critical deceleration. It is of importance that the average value of the speed at the wheel circumference approaches the ideal value as completely as possible over the entire speed range.

It can be easily seen that the correct determination of the value of the critical deceleration — point A in FIG. 2a — is of eminent importance. This determination may be effected by means of driving tests. Furthermore, it is extremely important to be able to determine at any time whether or not in a certain case the wheel has reached or whether it has surpassed the critical deceleration. The quality of the antiskid system will stand or fall with the precision of this determination. The electronic control of the antiskid system has to carry out this determination by means of the wheel impulses supplied by sensor 30.

As is known from driving tests the critical deceleration is not constant and its value will go up as the speed increases. This dependence on the speed can be explained in physical terms. Within the framework of the present specification, however, only the result is to be considered which is shown in FIG. 4 and which can be expressed by the following equation:

$$V'_{krit} = k_1 + k_2 V \qquad (1)$$

$V'_{krit}$ = critical deceleration $v$ = speed at the circumference of the wheel $k_1$ = constant $k_2$ = constant For the purpose of measuring decelerations and accelerations of the wheel the revolutions of the wheel or fractions thereof, respectively, are counted during a certain period and compared with the previous result obtained by counting. To this end, the undermentioned device is used which advantageously is provided separately for each wheel of a motor vehicle and which will be explained with respect to FIGS. 5 to 7 inclusive.

On the wheel a toothed disc is provided whose number of teeth is dimensioned such that the rolling motion of the tire pertaining to the wheel be several centimeters per pitch. The toothed disc acts by induction on a sensor which emits a wheel impulse per ascending tooth flank. The wheel impulses the repetition frequency of which is speed-dependent will be counted in a count-up counter $NZ^+$. The period $ta$ of the count-up is determined as follows:

A count-up counter (up-counter) $Z^+$ counts the impulses $f_{osz}$ of an oscillator of constant frequency which lies considerably above the highest frequency to be expected of the wheel impulses. A certain counting value $TG_1$ being reached in the counter $Z^+$, the counter circuit will be influenced in such manner that upon the arrival of the first subsequent wheel impulse the contents of counter $Z^+$ and of counter $NZ^+$, respectively, will be transferred in a parallel manner to associated count-down counters (downcounters) $Z^-$ and $NZ^-$, respectively, by means of a transfer impulse. The two count-up counters $Z^+$ and $NZ^+$ thereupon will be set back by an extinguishing or rest impulse and will then be ready for a new count-up run.

Figure 6:
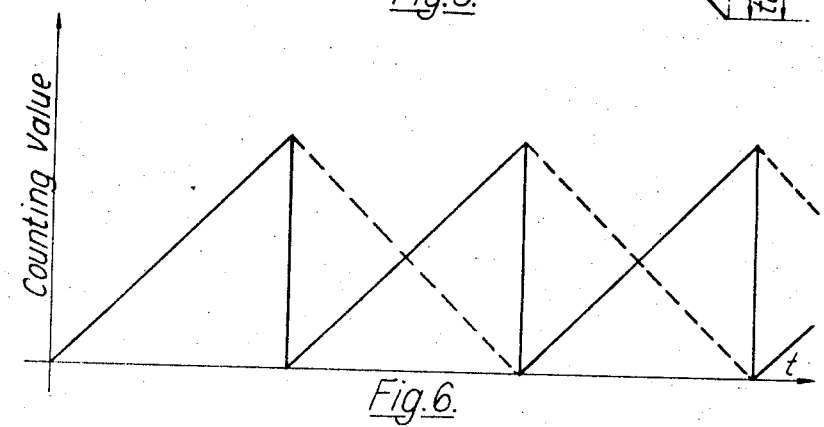
FIG. 6 illustrates the nature of interlocking of the measuring cycles in accordance with the principles of the present invention.
Figure 7:
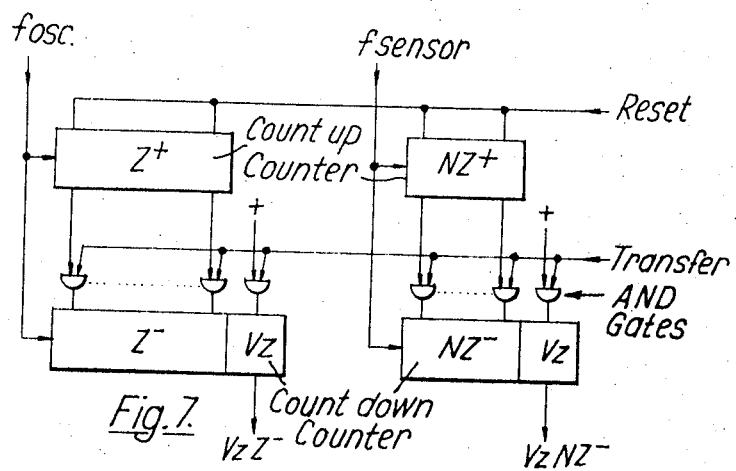
FIG. 7 is a block diagram of the counter circuits for carrying out the method in accordance with the principles of the present invention.

In FIG. 6 the up-counters are illustrated by solid lines, the downcounters being illustrated by dotted lines. As is seen from this figure during the count-down a new count-up is carried out. The same recognition frequency could be achieved by using two up-down counters for each of the counters Z and NZ which alternatively would be connected to the sensor and to the recognition system. Since, however, certain corrections have to be made during the count-down as will be described below the devices to make these corrections would have to be supplied twice which would increase the costs, but which in a technical respect would have certain advantages.

The counting value transferred to the down-counter $Z^-$ now will be counted down with the oscillator frequency $f_{osz}$ during a period $tr$ determined by the down-counter $NZ^-$. The counting value transferred to the down-counter $NZ^-$ will be counted down with the frequency of the newly arriving wheel impulses. Upon reaching the counting value of zero in counter $NZ^-$ and counter $Z^-$ will be arrested. The sign of the remaining counting value $td$ in counter $Z^-$ will show whether there has been a deceleration or acceleration of the wheel controlled by the sensor during the countdown period $tr$ in relation to the count-up time $ta$.

Figure 5:
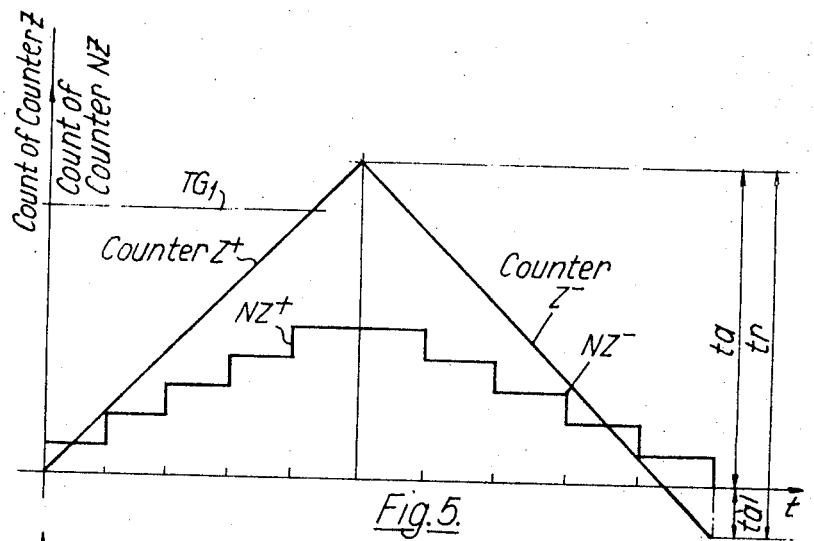
FIG. 5 illustrates a diagram of a counting run for the determination of the critical deceleration in accordance with the principles of the present invention.

In FIG. 5 the counting values of the two counters Z and NZ are plotted on the same time axis, the sensor pulses being marked on the time axis itself. The counting value of the counters $Z^+$ and $Z^-$ illustrated by straight lines in reality of course has the shape of a staircase curve, too, the steps, however, being very small so that they do not appear in the drawing.

The counting value $td$ remaining in the down-counter $Z^-$ now can be used for the calculation of the value of the deceleration or acceleration. However, the fact that the count-up time $ta$ is not constant but ends with the first wheel impulse which arrives after the limit or counting value $TG_1$ has been reached must be taken into consideration. This means that in the event of a small circumferential speed of the wheel — i.e. few wheel impulses until the limit value $TG_1$ is reached — the count-up time $ta$ has a considerable surplus in relation to $TG_1$, said surplus virtually being reduced to zero if the speed increases but slightly since now a wheel impulse arrives shortly after $TG_1$ has been reached and terminates the count-up time $ta$, said wheel impulse previously having arrived shortly before reaching $TG_1$ and the count-up time thus having been terminated only by the next impulse. Theoretically there is the possibility that the count-up time is prolonged infinitely if no further wheel impulse arrives due to the locking of one wheel. Practically, however, the maximum count-up time $ta$ will be apparatively limited to $(P)$ $(TG_1)$ by means of a signal $TG_5$ derived from counter $Z^+$.

For the deceleration there results $$V' = 2/(ta + tr) \left[ (N.S/ta) - (N.S/tr) \right] \text{ [m/s}^2\text{]} \quad (2)$$

$$V' = 2NS \, (tr - ta)/(ta^2 tr + tatr^2)$$

$N$ = Number of wheel impulses during, respectively, $ta$ or $tr$ $S$ = Rolling motion of the wheel per pitch.

The deceleration calculated from equation (2) should now be compared with the critical deceleration determined according to equation (1).

It is easily seen that the result of equation (1) inserted in equation (2) would require a considerable expense of apparatus in the electronic control of an antiskid system, the time of computation being relatively long. Therefore, another solution has to be found. Further, the fact that the measuring of the deceleration of the wheel is inevitably subject to certain malfunctions which lead to disturbances in the antiskid system has to be considered. As examples for system-inherent disturbances the malfunction caused by the pitch and the malfunctioning resolution should be mentioned. Since certain manufacturing tolerances for the manufacture of the toothed disc fixed at the wheel and supplying the wheel impulses have to be expected, there may be the case that the pitch will cause a malfunction once at the negative limit of tolerance during the count-up time $ta$ and once at the positive limit of tolerance during the count-down time $tr$. Calculations on the basis of practical embodiments have shown that the deceleration simulated by this pitch malfunction lies within the same order as the critical deceleration, the speeds being small.

The disturbance described as malfunctioning resolution is caused by the finite value of the oscillator frequency. However, due to the finitely small steps of the counters $Z$ errors with respect to the roundness of the steps will result. The value of these errors, however, is considerably smaller than that of the deceleration simulated by the pitch malfunction.

Besides the mentioned disturbances caused by the antiskid system itself, there exist of course other disturbances caused by conditions of the vehicle and of the road surfaces. It is known, for instance, from driving tests that driving over pot-holes causes decelerations and accelerations at the wheel, the absolute values of these decelerations and accelerations lying above the absolute value of the critical deceleration.

As already mentioned in connection with FIG. 2, electronic control 32 must emit an order to hydraulic control 33 for reducing the brake pressure when point A — the critical deceleration — has been reached. To this end, electronic control 32 is to determine at first that point A has been reached.

In case $ta = TG_1$—i.e. upon reaching of counting value $TG_1$ in the up-counter $Z^+$ there just arrives a wheel impulse so that the counting value $TG_1$ will be transferred to the down-counter $Z^-$ — it can be said that there is a deceleration if the down-counter $Z^-$ changes its sign before the down-counter $NZ^-$ changes its respective sign, while in the reversed temporal sequence there is an acceleration Since, however, it is not the fact of the existance of any deceleration which is important but only the determination that the deceleration has reached the critical value, the count-down run of the down-counter $Z^-$ is influenced such that the critical deceleration will have been surpassed if the counter $Z^-$ changes its sign before the counter $Z^-$ has canged its respective sign while the critical deceleration will not yet have been reached if counter $NZ^-$ changes its sign before counter $Z^-$. This means that the critical deceleration will be reached if both counters $NZ^-$ and $Z^-$ will simultaneously change their signs. This also means that the determination of whether or not the critical deceleration has been reached or whether it has been surpassed is reduced to the simple determination of the temporal position of the change of signs of counter $Z^-$ in relation to the temporal position of the change of signs of counter $NZ^-$.

Figure 8:
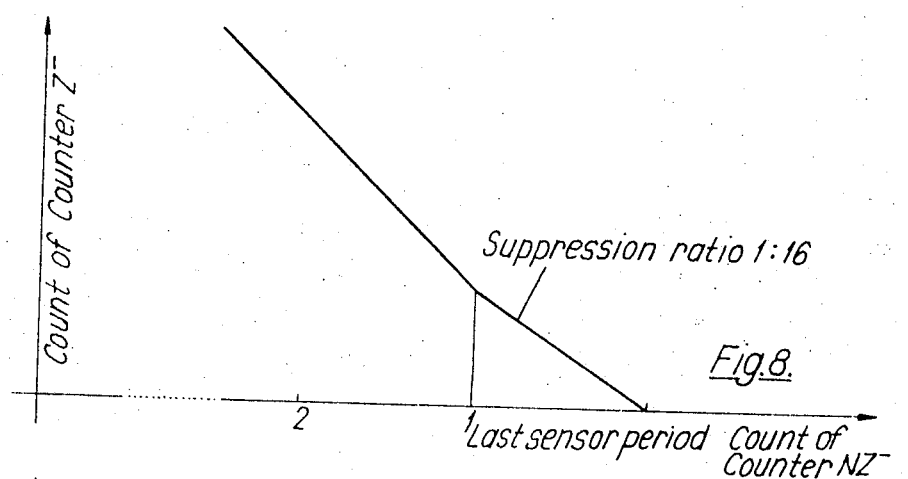
FIG. 8 illustrates the influence on the count-down run during the last sensor period.

The above-mentioned influence on the count-down run now is explained relative to FIG. 8 which schematically shows the end of the count-down run.

As can be seen from FIG. 8 during the last wheel pulse within the count-down run, i.e., when the down-counter's $NZ^-$ counting value is one, the count-down frequency of the down-counter $Z^-$ which normally is determined by the oscillator frequency is reduced by a reducing constant $k_3$. This for example is brought about by suppressing $m$ impulses of $n$ oscillator impulses.

It can be proven that by selecting $TG_1$, the reducing constant $k_3$, and possibly a preset value $GW_1$ of the up-counter $Z^+$ deviating from zero it is possible to freely select the position of the starting points, i.e., the critical deceleration, provided $GW_1 + ta = TG_1$. In this case the starting points almost lie in a straight line.

Figure 9:
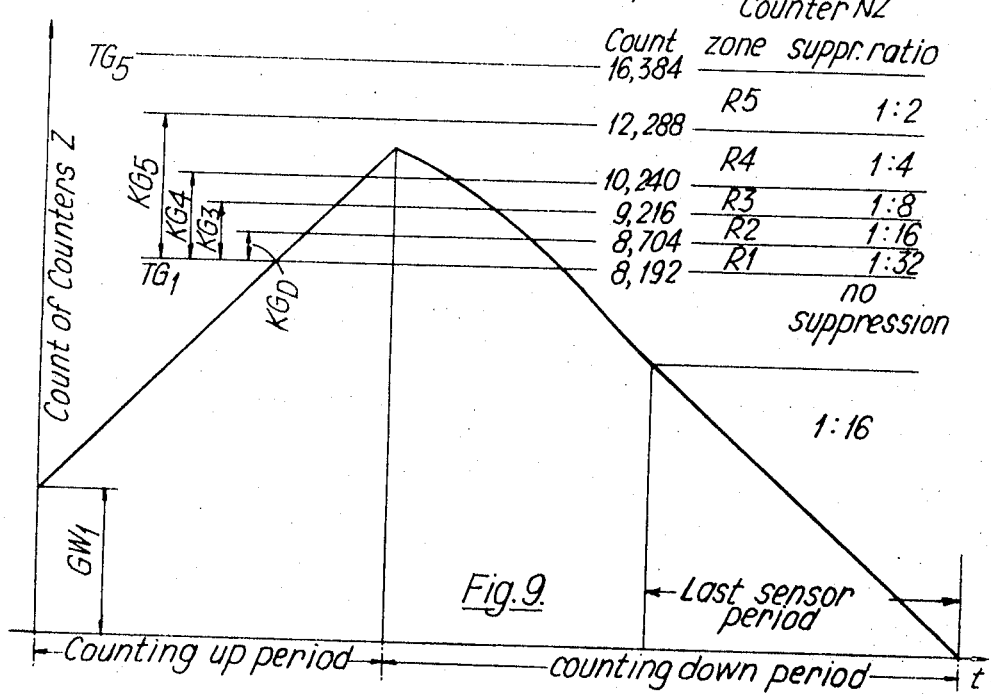
FIG. 9 illustrates the influence on the count-down run for the purpose of compensating for the surplus of count-up time.

In practice, however, $ta$ generally will be greater than $TG_1$. According to the surplus of $ta$ in relation to $TG_1$ there has $tr$ be introduced additional correcting measures. To this end, at the beginning of the count-down pulses will also be suppressed in order to retard the count-down. This is effected in several stages or zones with different reducing factors for each zone as illustrated in FIG. 9. If the counting value surpasses the limit value $KG_5$ during the count-up the oscillator impulses for down-counter $Z^-$ at first will be suppressed in the ratio of $m_5 : n_5$ (1:2), i.e., $m_5 = 1$ of $n_5 = 2$ oscillator impulses will be suppressed until the counting value in down-counter $Z^-$ has been reduced to the limit value $KG_5$. From this limit value onwards the oscillator impulses will be suppressed in the ratio of $m_4 : n_4$ (1:4), i.e., $m_4 = 1$ of $n_4 = 4$ oscillator impulses will be suppressed. From the limit value $KG_r$ onwards the suppression will be effected in the ratio of $m_3 : n_3$ (1:8). From $KG_3$ onwards the suppression ratio will be $m_2 : n_2$ (1:16) and from $KG_2$ onwards the suppression ratio will be $m_1 : n_1$ (1:32). When the counting value reaches the limit value $TG_1$ and until the beginning of the last sensor period the count-down will be carried through with the oscillator frequency and without suppression. During the last sensor period the suppression ratio will be $m : n$ (1:16) as already mentioned above.

At any time, the count-down run will always start with the suppression ratio which applies to the range reached by the counting value during the count-up. Above the limit value $KG_5$ the counting value in the count-up counter may ascend to a maximum of (p) ($TG_1$) as already mentioned above.

From FIG. 9 it can be seen that the count-up is linear while the beginning of the count-down above $TG_1$ proceeds on a non-linear path, the trace of straight lines of different inclinations representing an approximation to an exponential path. Principally it might be possible to have the count-up above $TG_1$ take a non-linear course in order to then have a linear count-down.

Figure 10:
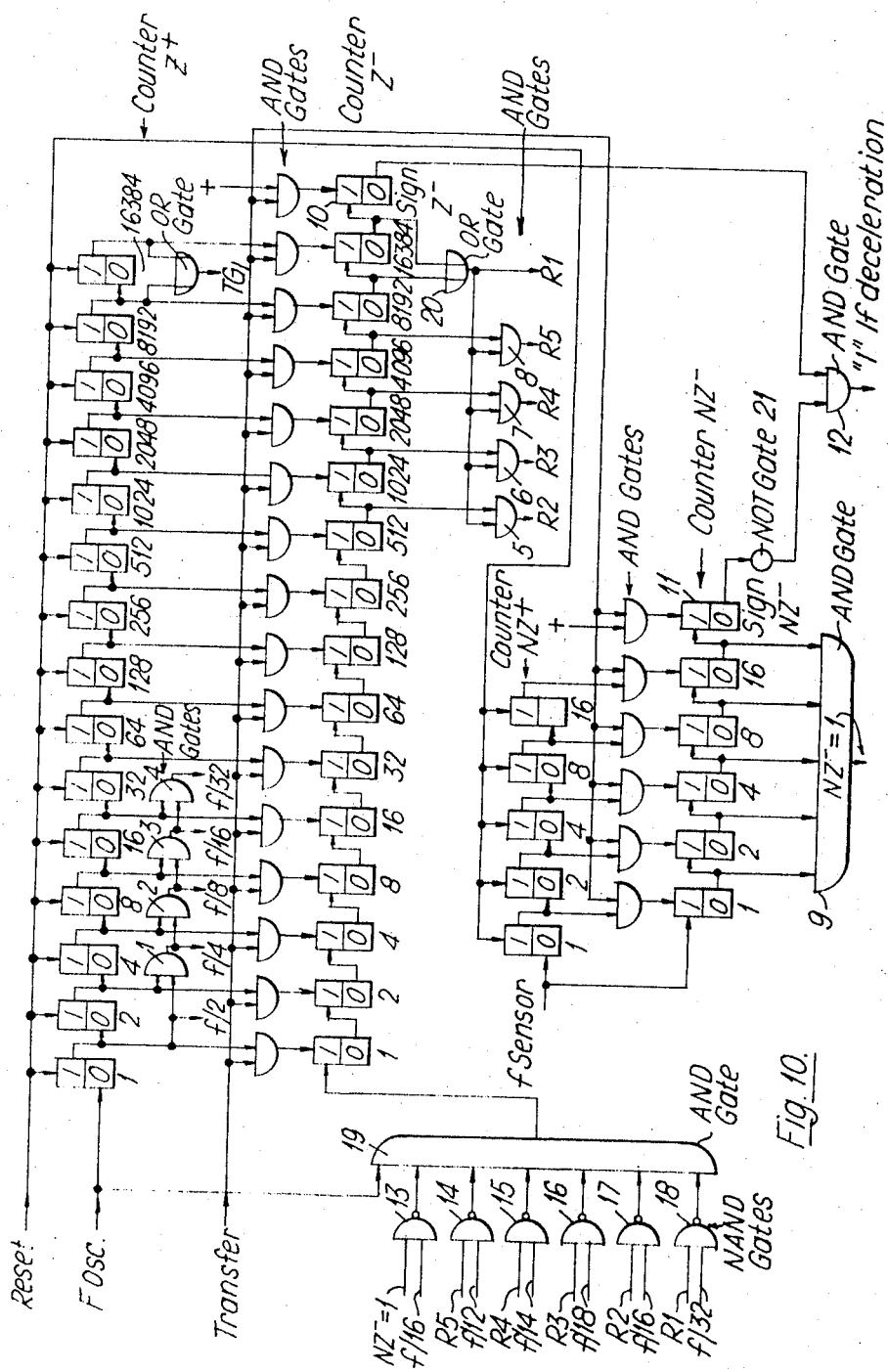
FIG. 10 is a logic diagram of one embodiment of the counter and logic circuitry to carry out the method in accordance with the principles of the present invention.

Referring to FIG. 10, there is illustrated therein a logic diagram for the various counters and logic circuitry associated therewith to carry out the non-linear count-down arrangement as illustrated in FIG. 9. FIG. 10 illustrates counters $Z^+$ and $Z^-$ each consisting of fifteen flip flops. To certain selected stages of counter $Z^+$ AND gates 1–4 are connected to produce signals having frequencies which are fractions of the oscillator frequency $f_{osc}$. To some stages of counter $Z^-$ AND gates 5–8 are connected directly and through OR gate 20 to produce zone signals for the zones R1 to R5 illustrated in FIG. 9.

FIG. 10 also illustrates counter $NZ^+$ and $NZ^-$ each consisting of five flip flops. With the aid of AND gate 9 having its inputs connected to the respective outputs of the flip flops a signal can be produced which is a binary "1" during the last sensor period, i.e., the signal $NZ^- = 1$. In fact, the count of counter $NZ^-$ is zero during this period. In order to reduce the count-down frequency of counter $Z^-$ by a constant $k_3$ during the last sensor period one out of sixteen pulses of the oscillator frequency $f_{osc}$ clocking the counter $Z^-$ is blanked out by applying the output signal $f/16$ of AND gate 3 together with the output signal ($NZ^- = 1$) of AND gate 9 to NAND gate 13. The output signal of gate 13 is applied to AND gate 19 together with the oscillator frequency $f_{osc}$ so that each 16th pulse of the oscillator frequency is suppressed.

The last stages of counters $Z^-$ and $NZ^-$ are connected to flip flops 10 and 11, respectively, to produce an output signal "1" when the count of the counters have reached zero. With the aid of AND gate 12 and NOT gate 21 a binary "1" output is produced when counter $Z^-$ reaches the count zero before counter $NZ^-$ reaches the count zero, i.e., when a critical deceleration (negative acceleration) occurs. This signal can be used to activate hydraulic control 33 of FIG. 1. A binary "0" output is produced from gate 12 when counter $NZ^-$ reaches count zero before counter $Z^-$ reaches the count zero, i.e., when a certain acceleration occurs.

In order to achieve the non-linear count-down in counter $Z^-$, as indicated in FIG. 9, some pulses of the oscillator frequency $f_{osc}$ clocking counter $Z^-$ have to be blanked out and the ratio of pulse suppression is to be changed during the counting process. If the count of counter $Z^+$ is higher than the limit value $KG_5$, i.e., more than 12,288, zone R5 is reached and the zone signal R5 at the output of AND gate 8 will be binary "1" when the count of counter $Z^+$ is transferred to counter $Z^-$. This signal is applied to NAND gate 14 connected with the signal $f/2$ at the output of the first flip flop of counter $Z^+$. Thus, with the aid of AND gate 19 to which the output of NAND gate 14 is applied together with the oscillator frequency $f_{osc}$ one out of two oscillator pulses is blanked out. When the count of counter $Z^-$ falls below the limit value $KG_5$, zone R4 is reached. The output of AND gate 8 will become a binary "0," but the output of AND gate 7 (zone signal R4) will become binary "1." This signal is applied to NAND gate 15 together with a signal $f/4$ present at the output of AND gate 1 so that via AND gate 19 one out of four oscillator pulses is blanked out. In a similar way, employing AND gate 6 and NAND gate 16 one out of eight pulses are blanked out in zone R3, employing AND gate 5 and NAND gate 17 one out of sixteen pulses are blanked out in zone R2 and employing OR gate 20 and NAND gate 18 one out of thirty two pulses are blanked out in zone R1. Below the count 8,193, i.e., below $TG_1$ no oscillator pulses are blanked out until the last sensor period is reached where one out of sixteen pulses is blanked out by employing the output of AND gate 9 and NAND gate 13 as previously mentioned hereinabove.

While I have described above the principles of my invention in connection with specific apparatus it is to be clearly understood that this description is made only by way of example and not as a limitation to the scope of my invention as set forth in the objects thereof and in the accompanying claims.

I claim:

1. A method for the determination of certain accelerations of at least one wheel of vehicular wheels controlled by an antiskid system comprising, during each measuring cycle, the steps of:

generating first impulses proportional to the speed of said one wheel of said vehicular wheels;

generating second impulses proportional to a predetermined constant frequency;

counting said first impulses in an upward direction until a first given counting value is reached; said first counting said second impulses in an upward direction until said first given counting value is reached;

counting said first impulses in a downward direction upon occurrence of a first of said first impulses after said first given counting value has been reached;

counting said second impulses in a downward direction, under the influence of said counting said first impulses in a downward direction, upon occurrence of said first of said first impulses after said first given counting value has been reached; and determining from the counting value achieved in the last two steps of counting with respect to a second given counting value different than said first given counting value said certain accelerations.

2. A method according to claim 1, wherein said step of counting said first impulses in an upward direction in one measuring cycle and said step of counting said first impulses in a downward direction in a previous adjacent measuring cycle occurs simultaneously, and said step of counting said second impulses in an upward direction in one measuring cycle and said step of counting said second impulse in a downward direction in a previous measuring cycle occurs simultaneously 3. A method according to claim 2, wherein
said step of counting said second impulses in a downward-direction includes the step of
suppressing a given number of said second impulses when said step of counting said first impulses in a downward direction is between two given counting values so as to retard said step of counting said second impulses in a downward direction.

4. A method according to claim 3, wherein
said two given counting values are one and zero.

5. A method according to claim 1, wherein
said step of counting said second impulses in a downward direction includes the step of
suppressing a given number of said second impulses when said step of counting said first impulses in a downward direction is between two given counting values so as to retard said step of counting said second impulses in a downward direction.

6. A method according to claim 5, wherein
said two given counting values are one and zero.

7. A method according to claim 1, wherein
said step of counting said second impulses in an upward direction until said first of said first impulses after said first given counting value has been reached results in a surplus of counting values, and
further including the step of
suppressing a given number of said second impulses at the beginning of said step of counting said second impulses in a downward direction to compensate for said surplus of counting values.

8. A method according to claim 7, wherein
said step of suppressing is varied dependent upon the amount of said surplus of counting values.

9. A method according to claim 8, werein
said step of suppressing is accomplished in several different stages determined by said amount of said surplus of counting values.

10. An arrangement for the determination of certain accelerations of at least one wheel of vehicular wheels controlled by an antiskid system comprising:
a first source of first impulses proportional to the speed of said one wheel of said vehicular wheels;
a second source of second impulses proportional to a predetermined constant frequency;
first means coupled to said first source to count said first impulses in an upward direction until a first given counting value is reached and to count said first impulse in a downward direction upon occurrence of a first of said first impulses after said first given counting value has been reached;
second means coupled to said second source and said first means to count said second impulses in an upward direction until said first given counting value is reached and to count said second impulses in a downward direction, under the influence of said first means counting in a downward direction, upon occurrence of said first of said first impulses after said first given counting value has been reached; and
third means coupled to said first and second means to determine from the relative counting values of said first and second means during counting in the downward direction with respect to a second given counting value different than said first given counting value said certain accelerations.

11. An arrangement according to claim 10, wherein
said first means includes
a first up-counter coupled to said first source to count said first impulses until said first given counting value is reached,
a first down-counter coupled to said first source to count said first impulses upon occurence of a first of said first impulses after said first given counting value have been reached, and
first logic circuitry coupled between said first up-counter and said first down-counter to transfer the count of said first up-counter to said first down-counter upon occurrence of said first of said first impulses after said first given counting value has been reached; and
said second means includes
a second up-counter coupled to said second source to count said second impulses until said first given counting value is reached,
a second down-counter coupled to said second source to count said second impulses upon occurrence of a first of said first impulses after said first given counting value has been reached, and
second logic circuitry coupled between said second upcounter and said second down-counter to transfer the count of said second up-counter to said second down-counter upon occurrence of said first of said first impulses after said first given counting value has been reached.

12. An arrangement according to claim 11, wherein
said third means includes
third logic circuitry coupled to the last stage of said first down-counter and to the last stage of said second downcounter to produce signals indicative of said certain accelerations.

13. An arrangement according to claim 12, wherein
each of said first and second down-counters includes
a different predetermined number of cascade connected flips flops; and
said third logic circuitry is coupled to the last flip flop of each of said first and second down-counter and produces a binary "1" output signal therefrom when the count of said second down-counter becomes zero before the count of said first down-counter becomes zero, said binary "1" output signal being indicative of a critical deceleration for actuation of said antiskid system.

14. An arrangement according to claim 13, further including
fourth logic circuitry coupled to each of said flip flops of said first down-counter, selected ones of said flip flops of said second down-counter, selected stages of said second up-counter, said second source and the first of said flip flops of said second downcounter to alter the count of said second down-counter by suppressing m impulse of n impulses of said second impulses between the count of one and zero of said second down-counter, where m and n are different integers.

15. An arrangement according to claim 14, wherein
$m$ is equal to one and $n$ is equal to 16.

16. An arrangement according to claim 13, further including
fourth logic circuitry coupled to each of said flip flops of said first down-counter, selected ones of said flip flops of said second down-counter, selected stages of said second up-counter, said second source and the first of said flip flops of said second down-counter to alter the count of said second down-counter in five different counting zones, each of said zones having a different suppression ratio of impulses of said second impulses, said first zone starting at the beginning of the counting of said second down-counter and said fifth zone ends at said first given counting value.

17. An arrangement according to claim 16, wherein said first zone has a suppression ratio of 1:2, said second zone has a suppression ratio of 1:4, said third zone has a suppression ration of 1:8, said fourth zone has a suppression ratio of 1:16 and said fifth zone has a suppression ratio of 1:32.

18. An arrangement according to claim 17, wherein said fourth logic circuitry further provides no suppression ratio between said first given counting value and a count of one of said second down-counter and a suppression ratio of 1:16 between a count of one and zero of said second down-counter.

* * * * *

UNITED STATES PATENT OFFICE
CERTIFICATE OF CORRECTION

Patent No. 3,746,925          Dated July 17, 1973

Inventor(s) Ellert Schaepman

It is certified that error appears in the above-identified patent and that said Letters Patent are hereby corrected as shown below:

On the Front Page between " [21] Appl. No.: 258,170" and " [52] U.S. Cl. 317/5, 303/21 GG, 307/232" insert -- [30] Foreign Application Priority Data July 2, 1971 Switzerland 9739/71--.

Signed and sealed this 1st day of January 1974.

(SEAL)
Attest:

EDWARD M. FLETCHER, JR.
Attesting Officer

RENE D. TEGTMEYER
Acting Commissioner of Patents